Jan. 29, 1974  J. DUPRE  3,788,812
AUTOMATIC SATURATION ANALYSIS
Filed June 30, 1971  3 Sheets-Sheet 2
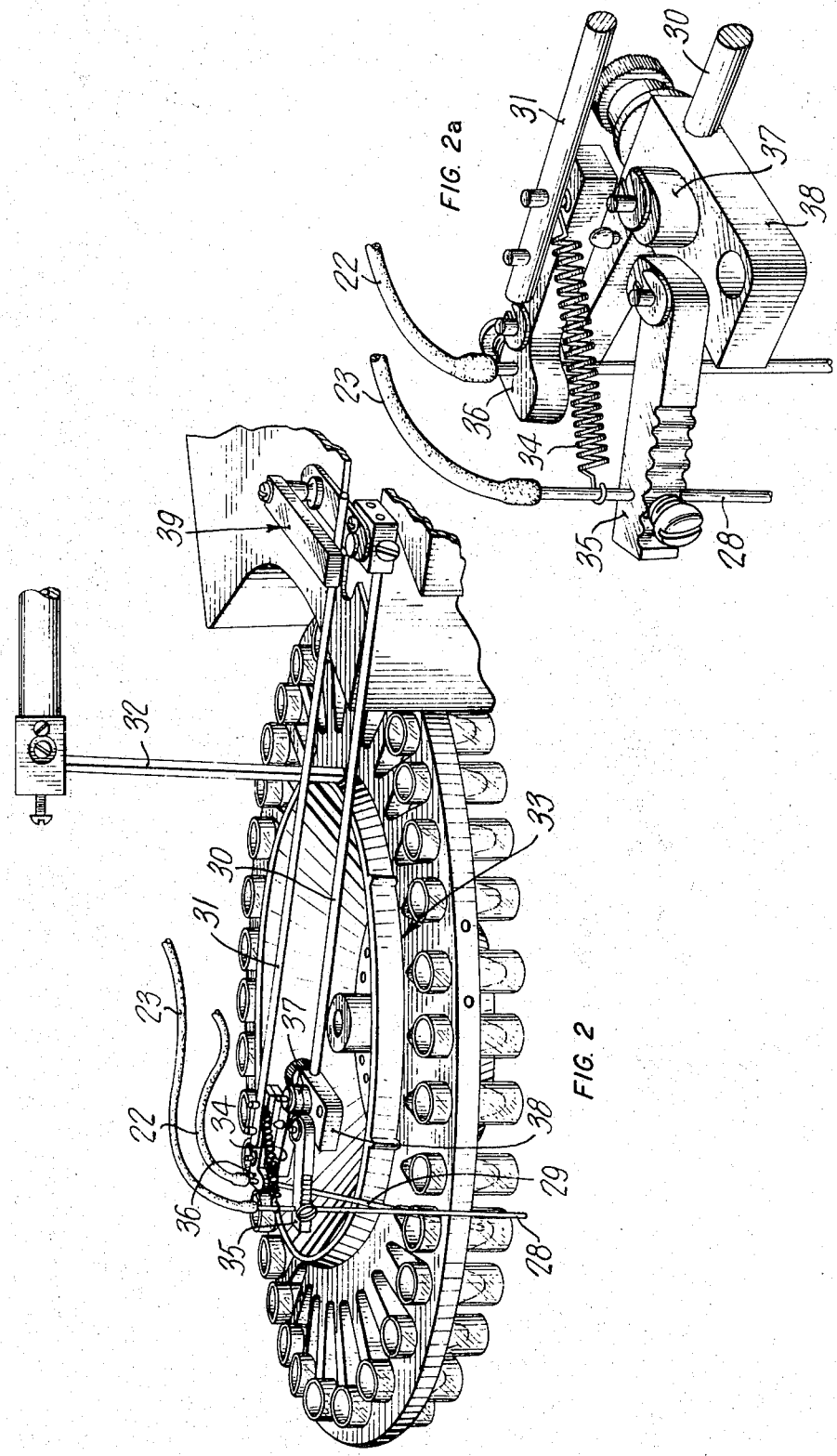

Jan. 29, 1974  J. DUPRE  3,788,812
AUTOMATIC SATURATION ANALYSIS
Filed June 30, 1971  3 Sheets-Sheet 3

United States Patent Office 3,788,812
Patented Jan. 29, 1974

3,788,812
AUTOMATIC SATURATION ANALYSIS
John Dupré, 92 Stafford, Baie d'Urfe, Quebec, Canada
Filed Aug. 30, 1971, Ser. No. 176,211
Int. Cl. G21h *5/02;* G01n *33/16*
U.S. Cl. 23—230 B                     15 Claims

ABSTRACT OF THE DISCLOSURE

An apparatus and a process for automatic saturation analysis of a solution comprising predetermined volumes of reagents and sample specimen. The apparatus comprises a first automatic transfer means for delivering a predetermined volume of reagents and a sample specimen into a reaction container for incubation where the tracer reagent equilibrates with a binding agent in solution distributing between bound and free moieties. A second automatic tranfer means delivers a predetermined volume of absorbent particles suspended in a buffer solution to the reaction container to absorb the free moiety of the tracer. A third automatic transfer means is provided having a filter associated therewith for separating the absorbent particles from the solution in the reaction container and for delivering the filtrate to a counting chamber for a quantitative measure of the radioactivity of the filtrate solution. Means are further provided for washing the first and third automatic transfer means to prevent contamination of successive solutions to be analyzed.

BACKGROUND OF THE INVENTION (a) Field of the invention

The present invention relates to an apparatus and process in which multiple specimens of solutions are sampled and "assayed" for materials capable of saturation analysis by competitive binding techniques.

(b) Description of prior art

A large number of competitive binding techniques for the estimation of substances present in solution have been developed. These techniques include the process known as radioimmunossay, and all depend upon displacement of a tracer reagent from association with a specific binding reagent by standard or unknown amounts of the substance to be assayed. In radioimmunossays the tracer is a radio-nuclide-labelled preparation of the substance to be assayed, and the binding agent is an antibody to that substance produced by immunisation of animals. After the mixing of reagents (tracer, binding agent, and standard or unknown amounts of the material to be assayed) and after a variable reaction interval, the bound and the free moieties of tracer are separated and quantitated. The unknown quantity of the substance to be assayed is derived from the distribution of tracer between the bound and free moieties, with reference to the distribution of tracer after incubations with standard amounts of the substance to be assayed. A variety of techniques for the separation of bound and free moieties of tracer have been used. When the binding agent is of high molecular weight and the substance to be assayed is of relatively low molecular weight, as in the case of immuno-assays for hormones, the absorption of the free moieties to various particulate absorbents in suspension can be employed. For example, particles of charcoal, talc, or cellulose have been used. The free tracer is absorbed to the particles and the bound tracer remains in solution. The separation of the bound and free moieties is then generally achieved by centrifugation and decantation. The tracer is estimated in the precipitate or supernatant, or in both, by means of an appropriate detecting system.

In a growing number of applications, it is necessary to handle large numbers of specimens while maintaining adequate control of the conditions of assay, including the time intervals between steps in the process. The large scale application of these procedures has been simplified by the use of manually regulated pipettes or semiautomated sampling procedures in the preparation of reaction mixtures. The separation of absorbent particles has been carried out by centrifugation, a procedure which leads to irregularities in the timing of the reaction, since the centrifugation is conducted with batches of samples. This separation procedure also necessitates manual transfer of samples to and from the centirfuge.

SUMMARY OF INVENTION

It is a feature of the present invention to provide an apparatus for automatically processing discrete samples through all the steps of competitive binding assays in which absorption of the free moiety to a particulate solid phase is used in the separation stage.

Accordingly, from a broad aspect, the present invention provides an apparatus and a process for automatic saturation analysis of a solution comprising predetermined volumes of reagents and sample specimen. The apparatus comprises a first automatic transfer means for delivering a predetermined volume of reagents and a sample specimen into a reaction container for incubation where the tracer reagent equilibrates with a specific binding agent in solution distributing between bound and free moieties. A second automatic transfer means delivers a predetermined volume of absorbent particles suspended in a buffer solution to the reaction container to absorb the free moieties of the tracer. A third automatic transfer means is provided having a filter associated therewith for separating the absorbent particles from the solution in the reaction container and for delivering the filtrate to a counting chamber for a quantitative measure of the radioactivity of the filtrate solution. Means are further provided for washing the first and third automatic transfer means to prevent contamination of successive solutions to be analyzed.

In the present specification the word "assayed" is defined as meaning an estimation of the concentration of a substance in a solution.

The system disclosed herein has been applied to a radioimmunossay procedure for the estimation of insulin in biological fluids, and makes the use of radio-iodinated insulin as the tracer reagent and of antibodies to insulin as the specific binding reagent.

The samples and reagents are delivered automatically by the reagent addition unit into vials travelling on racks. After incubation the suspension of absorebnt particles is added automatically, and the separation is achieved with a filtration unit in which the suspension is aspirated through a filter. The filtrate passes directly into a sealed chamber in the well of an automtaic device for the detection of gamma radiation.

The system depends on the reagent addition unit and the separation unit described in the specifications, and provides the necessary precision of addition of reagents to individual samples, with flexibility of volumes of reagents. The separation unit provides for consistent timing of the reaction with the individual specimens, and for rapid and effective separation of bound and free moieties, and it delivers filtrate directly into the counting chamber for quantitation of radioactivity. The counting chamber and filter are washed automatically after the passage of each specimen. The system is controlled by the action of timing units which employ cam-shafts driven by electric motors. The cams operate switches controlling the individual components of the system. Thus time intervals can be varied by modification of the cams, and the overall speed of operation can be varied by regulation of the electric motors. The total reaction time is constant and the rate of operation is dependent on the time needed for the quantitation of activity in the filtrate at the conclusion of the assay. These assays generally call for a counting period of at least 1 minute; the present automatic system has been designed to process samples at the approximate rate of 1 every 2 minutes, or at slower rates if longer counting intervals are required.

BRIEF DESCRIPTION OF DRAWINGS

In drawings which illustrate embodiments of this invention:

FIGS. 2 and 2a are perspective views of the sample probes of the reagent addition unit with their mechanism (not shown);

DESCRIPTION OF PREFERRED EMBODIMENTS

Figure 1A:
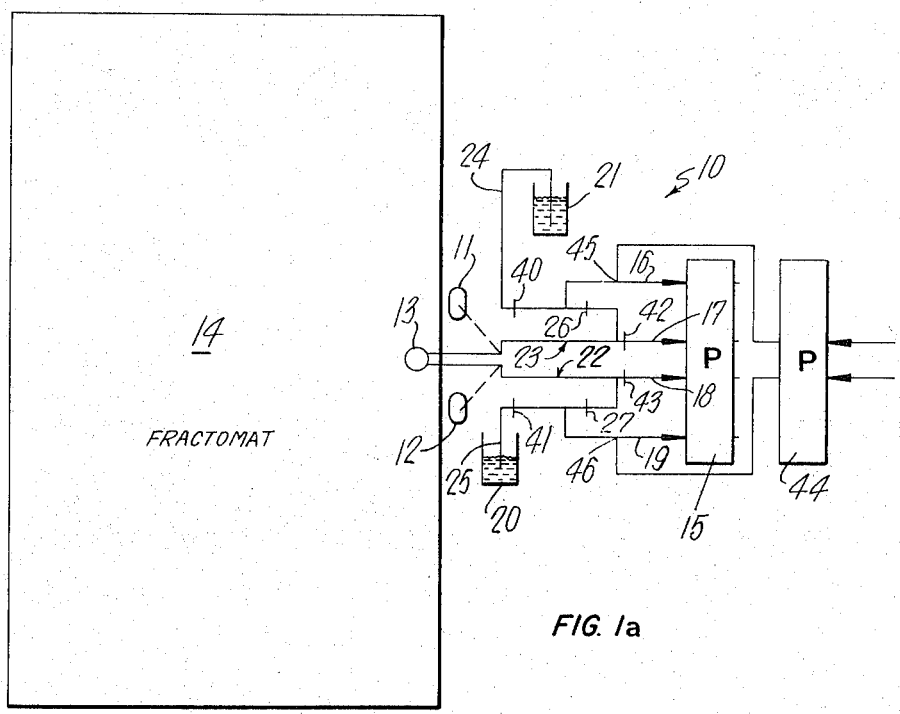
FIG. 1a is a schematic representation of the reagent addition system.

The embodiments of the invention will now be described with reference to the schematic drawings of FIGS. 1a and 1b and the remaining figures which illustrate specific parts of the system. In the reagent addition system, generally shown at 10 in FIG. 1a, aliquots of sample and tracer solutions are separately aspirated from containers 11 and 12 containing the sample and a tracer solution, respectively. The sample is brought to the sample point in a container or vial 11 on a removable turret (not shown). The sample and tracer are then aspirated simultaneously from containers 11 and 12. Aspiration of sample and tracer is achieved by means of a roller pump 15 bearing on sections of plastic tubes 17 and 18 and the volumes of aspiration are determined by the diameters of the tubes and the length of tubing filled. The aspirating pump 15 also bears on tube sections 19 and 16 drawing from reservoirs of specific binding agent 20 and incubation buffer 21, respectively, and these are connected by T-tubes 24 and 25 and branch lines to the sampler and trace tubes 23 and 22. However, since clamps 26 and 27 are closed, the reagent buffer and binding agent are restricted to those portions of tubing between the reagent reservoir 21 and binding agent reservoir 20, the intersections 45 and 46 and the aspiration pump lines 16 and 19.

At the end of the aspiration phase (see FIGS. 2–2a) the sampler arms 30 and 31 bearing the reagent probes 28 and 29, respectively, move to the delivery position for delivery into the reaction vial 13. The probes 28 and 29 are formed from 3 inch steel tubing having an outside diameter of 0.025 inch. The probes 28 and 29 are moved from their aspiration position into the sample and tracer reservoirs 11 and 12, respectively, to the delivery position by means of an electric motor (not shown) bearing sampler arms 30 and 31 which carry the probes. Sampler arm 31 is articulated to a rigid arm 32. The rigid arm 32 is moved between sampling and delivery positions by the action of controlled armatures 39 driven by an electric motor (not shown) having a cam arranged on the drive shaft of the motor forcing the probe through an arc between the sampling and the delivery positions. The probes 28 and 29 are secured to pivoted levers 35 and 36, respectively, lever 36 pivoting on a further lever 37 and coacting therewith to provide the proper movement of the probes. The end of sample arm 30 is connected to a mounting block 38 to which the free end of levers 35 and 37 are pivotally connected. In the course of movement to the sampling position for aspiration of the tracer and the unknown sample from their individual containers 12 and 11, the arms 30 and 31 are separated by the movement of the articulated arm 32 against the arm 31 and they diverge to enter the sample container 11 and tracer container 12, respectively. The sample vial 11 is positioned on a removable turret tray 33 containing a plurality of vials, each having a sample therein. The tracer reservoir 12 is a fixed container positioned adjacent the movable tray 33.

During the return movement of the sampler arms 30 and 31 to the delivery position, the probes 28 and 29 are approximated by the action of a spring 34 so that both probes enter the reaction vial 13. With the probes 28 and 29 in this position, the reagents are driven to the reaction vial 13. Referring again to FIG. 1a, delivery is achieved by electromagnetic closing of clamps 40, 41, 42 and 43, and opening of clamps 26 and 27, when a second roller pump 44, which reverses the flow, is activated. The sample and tracer are now driven into the reaction vial 13 followed by fixed quantities of binding agents and incubation buffer solutions. The required volumes of reagents having now been delivered into the reaction vial 13, the sampler probes 28 and 29 return to the sampling position while the movable tray 33 carrying the samples and the mechanized rack 14 carrying the reaction vials 13 shift to the next position. The solutions of binding reagents 20 and incubation buffer 21 wash out the tubing 22 and 23 which formerly contained the sample and tracer reagents, sufficiently to eliminate detectable contamination of successive samples. The reagent buffer is a carrier having suitable properties to allow a chemical reaction to occur during the incubation period.

Figure 1B:
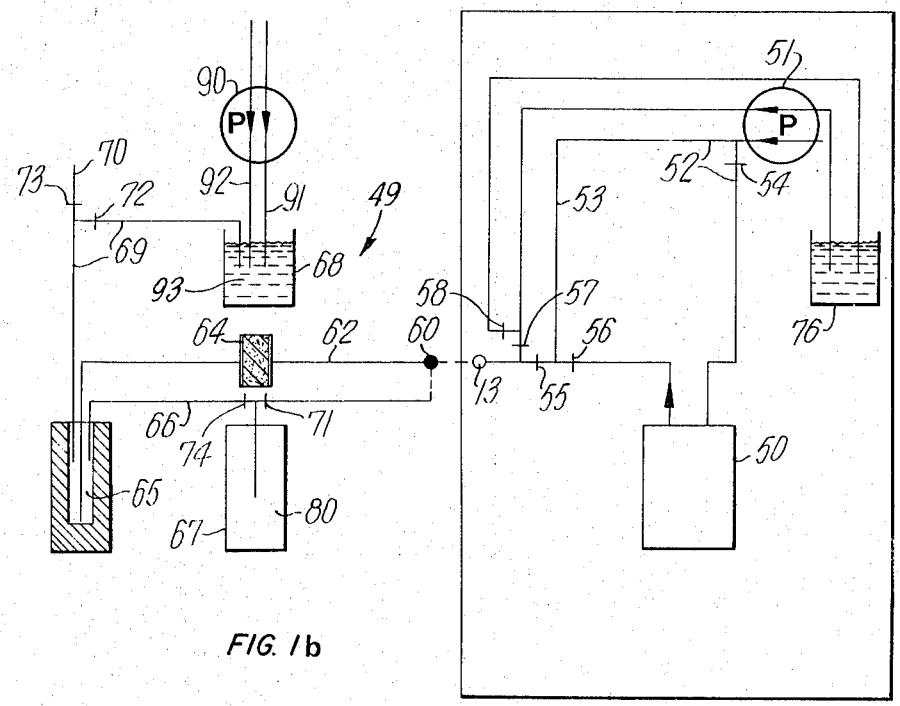
FIG. 1b is a schematic representation of the separation system.

The separation system as illustrated schematically in FIG. 1b and identified generally by numeral 49, is activated at the conclusion of the incubation period of the reagents in the reaction vial 13. Absorbent particles suspended in a buffer solution in reservoir 50 are added to the reaction mixture in the reaction vial 13 by means of a pump 51. This pump delivers the suspension from a segment portion 53, between electromagnetic clamps 54 and 55, of the tubing 52, which segment contains the predetermined volume of suspension to be added. When the suspension is not being delivered to a reaction vial it circulates through this tubing from the reservoir 50 via electromagnetic clamp 56 under the action of another pump (not shown). At the time of delivery of suspension to the reaction vial 13 via a stationary delivery probe 63, this other pump (not shown) is stopped, and after closure of electromagnetic clamps 54, 56 and 57 and opening of electromagnetic clamps 55 and 58, pump 51 is activated.

Figure 3:
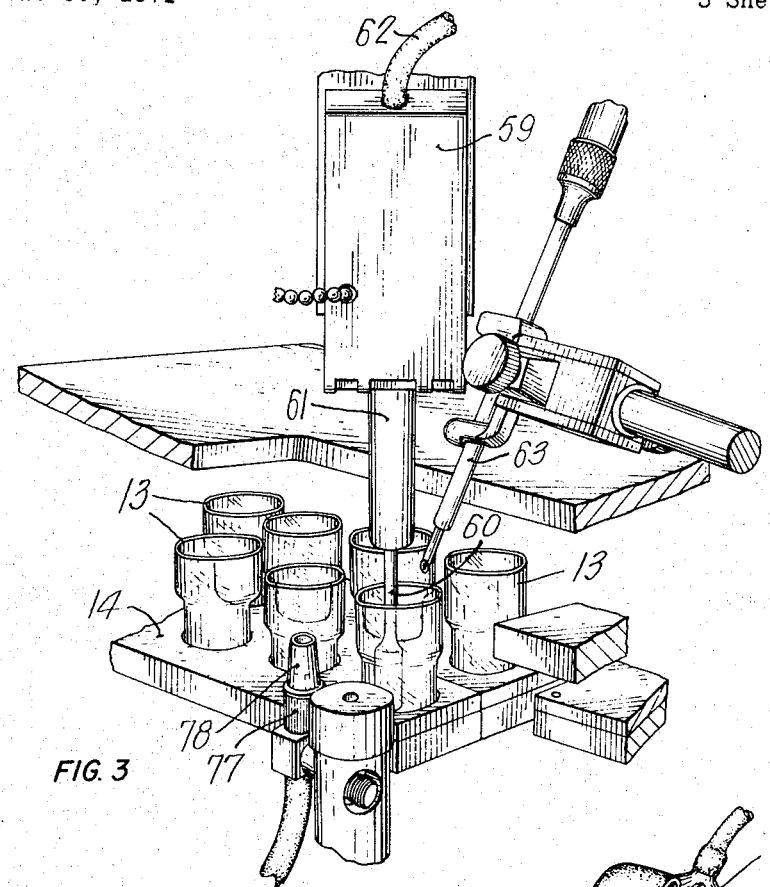
FIG. 3 is a perspective view of the separation probe mechanism.

Referring to FIG. 3, there is shown the separation probe 60, which probe is lowered into the reaction vial 13 by action from a solenoid armature 61 protruding through solenoid housing 59. The tubing 62 from the separation probe 60 is connected through an enclosed filter 64, and thence through to a sealed counting vial 79 positioned into a counting chamber 65 associated with radiation counting apparatus. This sealed vial 79 is connected by a vacuum tube line 66 to a vacuum pump 67, and to a wash reservoir 68 by a tube line 69. Line 69 is provided with a side arm 70 opening to the atmosphere. The absorption of the free moiety of the test substance to the particles is almost instantaneous. With electromagnetic clamps 71, 72 and 73 closed and 74 opened, the contents of the reaction vial 13 are aspirated through the filter 64 and the filtrate passes to the counting vial 79.

Figure 4:
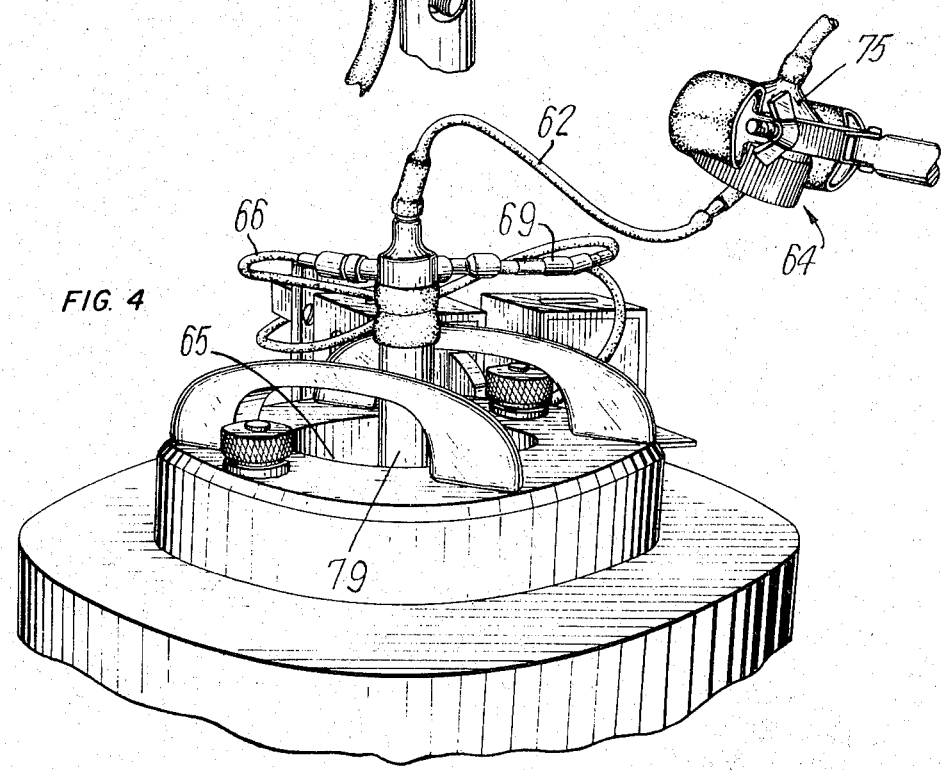
FIG. 4 is a perspective view of the filter and the counting chamber with their connections.

The filter 64 (FIG. 4) consists of a disc or pad of filter paper (not shown) supported between grids (not shown) contained within a screw-down pastic holder 75. The holder 75 is a "Millipore Microsyringe Holder xx30–025–00." The filter disc is of the type "Millipore Cellulose Pad No. AP 1002500." The efficiency and durability of the filter pad results from treatment of the paper with ethanolaqueous buffer in the washing process. Under these conditions the filter 64 retains the absorbent particles while the suspension is drawn through the pad.

The filter 64 is washed by reverse flow and is capable of repeated use through several hundred operations without failure to retain particles and without contamination of successive specimens. After aspiration of the suspension from the reaction vial 13 and passage of filtrate through the filter 64 a washing fluid (reaction buffer 93) is added to the reaction vial 13. This is achieved by the action of pump 51 drawing from a wash reservoir 76, and during this operation electromagnetic clamps 55 and 58 are closed while clamp 57 is opened. After addition of the washing fluid the contents of the reaction vial 13 are aspirated through the filter 64. A radiation-detecting device is then activated and operates for a selected period of time. At the conclusion of this counting interval, the separation probe 60 is lifted from the reaction vial 13 by the action of the solenoid armature 61. The probe 60 is then moved laterally by the solenoid armature 61 to a position above a back-wash connection 77, and is next lowered into the back-wash connection 77 upon switching off the solenoid. The activation of the solenoid also trips a switch (not shown) which in turn activates the movement of the reaction vial on the mechanized tray 14. The tip of the separation probe 60 is sealed by its weight and by vacuum into the plastic funnel end 78 of the back-wash connection 77. With electromagnetic clamps 71 and 72 closed and 74 and 73 opened, the contents of the counting vial 79 are aspirated into the trap container 80 on the vacuum line 66. The counting vial 79 is then rinsed from the wash reservoir 68 by aspiration, with clamps 71 and 70 closed and clamps 74 and 72 opened. When the counting vial 79 has been filled with a selected volume of wash, this volume is aspirated through the filter 64 with clamps 74 and 72 closed and clamps 71 and 70 opened. In this way the filter 64 is washed free of particles and radioactivity by reverse flow. The washing procedure is then repeated. The wash reservoir 68 is filled by tube 91 from pump 90 and this pump 90 also carries a further tube line 92 which delivers caprylic alcohol, an anti-foaming agent, to the wash reservoir 68. This agent serves to prevent bubble formation in the separation system. The reaction vials 13 having shifted one position, bringing the next specimen to the separation point, the separation probe 60 is returned to the aspiration position by the actions of the solenoid armature 61, and the cycle is repeated.

In order to compute the concentration of the test sample, in accordance with the process described hereinabove, it is required to process a plurality of samples of known composition to establish the distribution of the tracer in the presence of known quantities of test substances.

During prolonged incubation periods (48 to 72 hrs.) commonly used in radioimmunoassays the apparatus would be inactive. Efficient use of the system may be achieved by removing the racks of incubation vials 13 from their mechanized tray during the incubation period. This releases the system for use with further batches of samples. A greater increase in flexibility may be achieved by divorcing the reagent addition system 10 from the separation system 49. With an additional mechanical tray and an independent timing unit the separation process 49 can operate independently of the reagent addition process 10, and multiple assays with various overall reaction times can be accommodated. The overall rate of operation can be selected according to the time interval necessary for accurate radioactivity counting. This interval generally exceeds one minute and the system is capable of processing samples at the rate of one every two minutes or more slowly if necessary.

The system is applicable to any competitive binding assay technique in which absorbent particles which can be retained by the filter are employed by the separation stage. With the use of a detecting device with appropriate output, the apparatus can be connected to suitable recording or computing devices. The reagent addition system 10 achieves reproducibility not matched by conventional manual techniques. With the constancy of addition of tracer, no loss of precision is suffered as a result of rejection of the free moiety of tracer on the absorbent particles. The system is suitable for on-line regulation and processing of data by a laboratory computer. The feature of the reagent addition system 10 which distinguishes it from previously described automatic chemical procedures is the use of reagents in reverse flow to displace other reagents into the system and to wash the tubing, thus eliminating separate washing procedures. The unique features of the separation system 49 are the repeated use of the filter and the direct delivery of filtrate into the detecting device, with reresulting simplification and acceleration of the operation of the detecting system.

Table I shows an example of results obtained in an assay for insulin. The data shows the distribution of tracer (radioactive insulin) in the presence of a range of known amounts of insulin, together with the distribution of tracer in a specimen of blood serum of unknown insulin content. The estimate of insulin by the method of the present invention agrees closely with the estimate obtained in a conventional manual assay.

TABLE I

[Example of data from an assay for insulin carried out by means of the method herein described]

| Grammaradioactivity of filtrate (bound moiety of tracer) | Insulin concentration in samples of known composition ($\mu$u./ml.)[1] |
|---|---|
| Counts per minute: | |
| 3,045 | } 0. |
| 2,895 | |
| 2,318 | } 50. |
| 2,306 | |
| 2,002 | } 100. |
| 2,030 | |
| 1,791 | } 200. |
| 1,788 | |
| 2,209 | } Sample of blood serum with unknown insulin content. |
| 2,217 | |
| 2,222 | |

[1] Microunits per milliliter.

NOTES:
The samples of known composition were processed in duplicate. The data show the high reproducibiltiy of results.
The sample of unknown composition was processed in triplicate. The concentration of insulin in this sample was derived by computation (IBM 360) using a Fortran programme which in effect plots the observed counts-per-minute in the filtrate against the insulin content of samples of known composition, and arrive at the value for the unknown sample by interpolation. The same "unknown" sample was independently processed by conventional manual technique, and the result computed in the same way.

Results:

| | Insulin concentration in unknown sample |
|---|---|
| Manual technique | 56 $\mu$u./ml. |
| Automatic technique | 61 $\mu$u./ml. |

I claim:

1. An apparatus for automatic saturation analysis of a solution comprising first automatic transfer means for delivering a precise known volume of reagents and a sample specimen into a reaction container for incubation; said reagents including a known volume of a tracer solution, a reagent carrier buffer solution and a binding agent; said binding agent and incubation buffer displacing said sample and tracer therewith into said reaction container and washing a portion of said transfer means to sufficiently eliminate detectable contamination of successive samples, said tracer reagent during incubation equilibrating with a binding agent in solution distributing between bound and free moieties, a second automatic transfer means for delivery of a known volume of absorbent particles suspended in a buffer solution to said reaction container to absorb the free moieties of said tracer; a third automatic transfer means having a filter associated therewith for separating said absorbent particles from said solution in said reaction container and for delievering the filtrate to a counting chamber for a quantitative measure of the radioactivity of said filtrate solution, and means for automatically washing said first and third automatic transfer means to prevent contamination of successive solutions to be analyzed.

2. An apparatus as claimed in claim 1 wherein said first automatic transfer means comprises a first and second automatically controlled probe, a conduit connected to each said probe and to pump means, said conduit connected to said first probe further having a connection to a reagent buffer reservoir, said conduit connected to said second probe further having a connection to a binding agent reservoir, and first and second probe being moveable from a sampling position to a delivery position whereby predetermined volumes of said sample specimen, tracer solution, reagent buffer and binding agent are transferred.

3. An apparatus as claimed in claim 2 wherein clamp means are connected to said conduits, said clamp means being automatically actuated and synchronized to said pump means to close and open said conduits whereby predetermined quantities of said reagents are aspirated in said conduits and ejected therefrom.

4. An apparatus as claimed in claim 2 wherein said pump means comprises a first and a second roller pump associated with portions of said conduits, said first pump when activated causing a suction in said conduits connected to each said probe and said binding agent and tracer solution reservoir to thereby aspirate a predetermined volume of said reagents in said conduits, said second pump when activated causing ejection of said aspirated volumes of reagents through said first and second probes.

5. An apparatus as claimed in claim 1 wherein said second automatic transfer means comprises a delivery probe having a conduit connected thereto, said conduit having sections thereof associated with pump means and a reservoir having absorbent particles suspended in a buffer solution, clamp means associated with further sections of said conduit being automatically actuated and synchronized to said pump means whereby a predetermined volume of said absorbent partciles in suspension is delivered through said delivery probe to said reaction container.

6. An apparatus as claimed in claim 5 wherein said conduit sections associated with said reservoir are connected to said pump means and provided with spaced apart clamp means defining a segment of said conduit sections, said segment being associated with said pump whereby solution in said segment is delivered to said reaction container.

7. An apparatus as claimed in claim 5 wherein said conduit sections associated with said reservoir are connected to a further pump means whereby said suspension is caused to circulate through said tubing sections when said suspension is not being delivered to said reaction container.

8. An apparatus as claimed in claim 1 wherein said third automatic transfer means comprises a separation probe adapted to be positioned into said reaction container, a conduit connected at one end to said probe, said conduit having its other end opening into a sealed container, a filter positioned in said conduit between said separation probe and said sealed chamber, a vacuum pump line opening into said sealed container whereby the contents of said reaction container are aspirated through said filter, where said absorbent particles with said free moieties of said tracer solution are retained, and the filtrate is delivered to said sealed container.

9. An apparatus as claimed in claim 8 wherein said sealed container is positioned in a counting chamber associated with radiation counting apparatus whereby a quantitative measure of the radioactivity of said filtrate is measured.

10. An apparatus as claimed in claim 8 wherein said filter comprises a disc of filter paper supported between grids contained with a plastic holder secured for obstruction with said conduit.

11. An apparatus as claimed in claim 1 wherein said means for washing said third transfer means comprises means for delivering a washing fluid to said reaction container and said filter, means to aspirate the contents of said reaction container into a trap container, and means to aspirate a further wash into said reaction container and passing said further wash in reverse flow through said filter and associated probe.

12. An apparatus as claimed in claim 1 wherein there is provided a plurality of sample containers positioned on a moveable tray and synchronized for motion with a reaction tray having a plurality of said reaction containers mounted for automatic displacement thereon whereby a plurality of successive reagent addition steps can be performed without interruption.

13. An apparatus as claimed in claim 12 wherein said movable tray and reaction tray are removable from said apparatus, said reaction tray further being synchronized to the separation steps to permit automatic analysis of successive solutions in said plurality of reaction containers.

14. A process for automatic saturation analysis of a solution comprising the steps of
 (i) automatically aspirating a known volume of a sample specimen in a first probe and a reagent buffer in a portion of an associated conduit,
 (ii) simultaneously aspirating a known volume of a tracer solution in a second probe and a binding agent solution in a portion of an associated conduit,
 (iii) displacing said first and second probes to a reaction container, and ejecting said sample specimen, reagent buffer, tracer and binding agent into said reaction container,
 (iv) incubating said solution in said reaction container for a predetermined period of time,
 (v) automatically adding absorbent particles suspended in a buffer solution to said reaction solution after said incubation period,
 (vi) automatically filtering the absorbent particles from said reaction solution and delivering the filtrate to a sealed radiation counting chamber for a quantitative measure of radioactivity in said filtrate solution, and
 (vii) automatically washing the apparatus in contact with said reaction solution to prevent contamination of successive solutions to be analyzed.

15. A process as claimed in claim 14 wherein said step of filtering the absorbent particles from said reaction solution comprises positioning a probe into said reaction container, aspirating said solution through a filter to absorb said absorbent particles and directing the filtrate to a sealed counting chamber and backwashing said filter and said probe with a washing fluid.

References Cited
UNITED STATES PATENTS

| | | | |
|---|---|---|---|
| 3,615,222 | 10/1971 | Mead | 23—230 B |
| 3,567,393 | 3/1971 | Welch | 23—253 R |
| 3,437,447 | 4/1969 | Harmon | 23—253 R |
| 3,193,358 | 7/1965 | Baruch | 23—253 R |
| 3,475,130 | 10/1969 | Baruch | 23—253 R |
| 3,481,709 | 12/1969 | Slone | 23—253 R |
| 3,636,777 | 1/1972 | Frank et al. | 23—253 RX |
| 3,649,204 | 3/1972 | Farr | 23—253 RX |
| 3,666,854 | 5/1972 | Eisentraut | 250—106 TX |

JOSEPH SCOVRONEK, Primary Examiner

U.S. Cl. X.R.

23—23 O R, 253 R; 250—106 T; 424—1